United States Patent Office 3,778,405
Patented Dec. 11, 1973

3,778,405
PROCESS FOR PREPARING A POLYPHENYLENE LACQUER AND LAMINATES FABRICATED THEREWITH
Norman Bilow, Los Angeles, Calif., assignor to the United States of America as represented by the Secretary of the Air Force
No Drawing. Filed Dec. 30, 1971, Ser. No. 214,462
Int. Cl. C08g 51/30
U.S. Cl. 260—33.8 R
7 Claims

ABSTRACT OF THE DISCLOSURE

A substantially void-free laminate or composite is provided that comprises a reinforcing material coated with a cured copolymer of polyphenylene and a polysulfonyl halide, the copolymer having been prepared by reaction in an alcohol-free chloroform medium and applied to the reinforcing material as a solution in the medium.

FIELD OF THE INVENTION

This invention relates to a process for preparing a polyphenylene lacquer. In one aspect it relates to an improved matrix for laminated articles. In another aspect it relates to laminated articles which are substantially free of voids.

BACKGROUND OF THE INVENTION

It is common practice to utilize chloroform as the solvent in preparing polymer or resin lacquers. Chloroform is particularly suitable for this use because of its relatively low boiling point (61° C.) and its ability to dissolve many types of polymeric materials.

When chloroform is synthesized and stored as recovered, several by-products are formed as a result of the reaction of the product with oxygen in the air. One of these by-products is phosgene, a highly poisonous compound. In order to prevent the reaction with oxygen from occurring, manufacturers of chloroform add to the product a small amount of ethyl alcohol which functions as an antioxidant. Thus, chloroform containing a small amount of ethyl alcohol is the solvent that has actually been used in preparing many resin and polymer lacquers. In the prior art there appears to be no recognition of the fact that the presence of the antioxidant may have a deleterious effect during the preparation of the lacquer, and upon an applied coating after the solvent is evaporated and the polymer is cured. In actuality, workers in the art may well be unaware of the prsence of the ethyl alcohol since chloroform as conventionally sold does not always indicate that it is present.

In one process for preparing a polymer lacquer, a polyphenylene and a polysulfonyl halide are dissolved in a commercial chloroform, i.e., one containing alcohol, which has been dried by azeotropic distillation. The polyphenylene and the polysulfonyl halide react, forming a prepolymer that is in solution in the solvent.

In using the prepolymer as the matrix for forming a laminate, the solution is applied to a reinforcing material, such as carbon cloth. After air drying to remove the solvent, plies of the coated carbon cloth are heated under pressure so as to cure the prepolymer and form a laminated article. However, when proceeding in this manner, the laminates have not proven to be entirely satisfactory because of their high void content.

It is an object of this invention, therefore, to provide an improved polyphenylene lacquer.

Another object of the invention is to provide an improved process for preparing polyphenylene lacquers.

A further object of the invention is to provide an improved matrix for laminates or composites.

Still another object of the invention is to provide laminates that are substantially free of voids.

Other objects and advantages of the invention will become apparent to those skilled in the art upon consideration of the accompanying disclosure.

SUMMARY OF THE INVENTION

Broadly speaking, the present invention resides in a process for preparing a polyphenylene lacquer which comprises reacting a polyphenylene with a polysulfonyl halide in solution in chloroform which is free of ethyl alcohol. It has been discovered that by conducting the reaction in alcohol-free chloroform, a thermosetting polyphenylene resin is produced that has superior molding characteristics as well as better wetting characteristics. Furthermore, the cured resin has a very low void content which results in the product having superior physical properties.

In one embodiment of the invention, the polyphenylene lacquer is used in the formation of a matrix for fabricating laminated articles. In forming laminates or composites, plies of a reinforcing fabric or reinforcing fibers are coated with the lacquer and placed in a mold wherein they are heated under pressure. The resulting product is a laminate or composite having a cured, intractable polyphenylene matrix.

The polyphenylenes that are used in the practice of this invention are fusible resins that are soluble in chloroform. The resins are preferably prepared by the cationic oxidation of metaterphenyl or mixtures of meta-terphenyl and biphenyl. The polyphenylenes preferably have an average molecular weight, as determined by vapor phase osmometry in the range of 500 to 1500, preferably in the range of 800 to 1200, although higher molecular weight resins, e.g., up to 4000, can be employed. Generally, the polyphenylene used in the process is a mixture of polyphenylene molecules having molecular weights ranging, for example, form 500 to 1500.

The polysulfonyl halide used in the process functions as a crosslinking agent for the polyphenylene molecules. Generally, 1 part by weight of the halide is used with from about 2 to 3 parts by weight of the polyphenylene. In the previous discussion, the product of the process has been referred to as a polyphenylene lacquer. This lacquer can also be defined as a solution of a copolymer of a polyphenylene and an arylpolysulfonyl halide in alcohol-free chloroform.

In general, any arylpolysulfonyl halide can be employed in preparing the polyphenylene lacquer although chlorides and bromides are prefered. Examples of such compounds include benzenepolysulfonyl haldies, such as 1,3,5-benzenetrisulfonyl chloride and 1,3,5-benzenetrisulfonyl bromide, and biphenylsulfonyl halides, such as 4,4'-biphenyldisulfonyl chloride, a 3,4' - biphenyldisulfonyl halide and 3,3'-biphenyldisulfonyl bromide; and the like. Also, other diphenyl compounds can be used, for example, 4,4'; 3,3' and 3,4'- disulfonyl halide derivatives, that have the following structural formula:

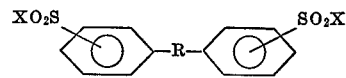

wherein R is selected from the group consisting of

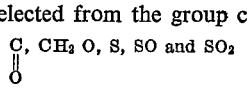

and X is Cl or Br.

A preferred procedure for carrying out the process of this invention is to dissolve the polyphenylene in the alcohol-free chloroform reaction medium. The solution is then stirred and refluxed in equipment provided with a water removal zone in the form of a water trap in the reflux line for a period of time sufficient to remove any water from the solution. This period can vary within wide limits, e.g., from 3 to 96 hours, depending upon the amount of water that may be present and the efficiency of the trap in removing water.

The amount of alcohol-free chloroform that is used as the reaction medium can vary within a rather wide range. However, the amount used should be sufficient so that the lacquer subsequently formed can be readily applied as a coating. On the other hand, too great amounts should not be used because of the economics and the possibility of inferior coatings resulting from too low a solids content. In general, the amount used should be sufficient to provide a lacquer having a solids content ranging from about 5 to 20 weight percent. However, it is to be understood that alcohol-free chloroform can be added to or removed from the lacquer produced by the process. The solution that is prepared in the initial step usually contains from about 5 to 30 weight percent polyphenylene, based on the total weight of the solution.

The arylpolysulfonyl halide is thereafter added to the solution in the amount previously indicated. Refluxing is continued for an additional period during which time the polyphenylene and the halide react to form a prepolymer. During the reaction, hydrogen chloride gas is evolved. The reaction period usually ranges from about 0.5 to 2 hours. It has been found that if the reactants are refluxed for more than about 2 hours, there is a tendency for the prepolymer to become too viscous for use in coating applications. The product so prepared is a lacquer containing alcohol-free chloroform and a prepolymer which is a copolymer of polyphenylene and an arylpolysulfonyl halide.

In fabricating laminates or composites, plies of reinforcing fabrics or fibers are first coated with the lacquer and stacked or placed in a mold. Any of the well known reinforcing materials can be used, including quartz and asbestos fabrics, carbonized fabrics, graphitized fabrics, carbon fibers, graphite fibers, and the like. The material in the mold is then heated and subjected to pressure, thereby forming a laminate or composite having as a matrix the copolymer of polyphenylene and the arylpolysulfonyl halide. As a result of the heating, the prepolymer is cured so that a thermosetting, intractable resin matrix is formed. The resin generally constitutes from about 30 to 45 weight percent of the laminate or composite. The curing time can vary within rather broad limits, depending to a large degree upon the size of the article that is being molded. Thus, large articles require longer cure times than smaller articles. Furthermore, the time is dependent upon the curing temperature used with higher cure temperatures requiring shorter cure times. The cure time usually ranges from about 1 to 24 hours. The curing temperature is generally in the range of about 450 to 550° F. while the pressure employed during the curing step ranges from about 5000 to 7500 p.s.i.

As mentioned hereinabove, the laminates and composites of this invention are substantially free of voids. As a result the molded articles have improved physical properties. This improvement is brought about by the discovery that a polyphenylene-arylpolysulfonyl halide copolymer prepared in an alcohol-free chloroform solvent provides a superior lacquer. The lacquer can be applied, e.g., by dipping or brushing, to reinforcing material to form a prepolymer coating that on curing produces a thermosetting resin having outstanding molding and wetting characteristics.

The unexpected results obtained are dependent upon the use of an alcohol-free chloroform as the reaction medium for preparing the prepolymer and as the solvent for the polyphenylene lacquer. Any problem associated with the presence of alcohol in the chloroform has previously gone unrecognized. The problem apparently arises from the ability of the alcohol to dehydrates, producing ethylene and water. The water so formed subsequently reacts with the sulfonyl halide, rendering it less soluble in the solvent and causing the reaction to proceed in a heterogeneous manner.

In the treatment of a commercial chloroform containing, e.g., 1 to 3 volume percent of ethyl alcohol, prior to use in the process of this invention, the chloroform is initially washed with concentrated sulfuric acid. The washing can be accomplished by any suitable means. In one procedure the chloroform is placed in a separatory funnel after which about 20 milliliters of sulfuric acid is added for each 100 milliliters of chloroform. It is to be understood that the amount of sulfuric acid can vary, e.g., from about 10 to 40 volume percent of the chloroform. After gently shaking the resulting mixture for a few seconds, e.g., from 3 to 10 seconds, the chloroform and sulfuric acid are allowed to separate into layers and the chloroform layer is then recovered. The chloroform recovered is then washed with distilled water, following the same procedure as with the sulfuric acid except as to the amounts of materials used. Thus, about 200 milliliters of water is added for each 100 milliliters of chloroform. The amount of water used can vary, but is generally in the range of 100 to 300 volume percent of the chloroform. The chloroform layer and water layer that form are then separated.

After separation from the water, the chloroform is dried by contacting it with a dessicant. This can be conveniently accomplished by pouring 100-milliliter batches into containers holding from about 10 to 20 grams of a dessicant, such as anhydrous calcium sulfate, and shaking the containers for a few seconds, i.e., from 2 to 10 seconds. The dried chloroform, which is then recovered by filtration, is free of ethyl alcohol.

A more complete understanding of the invention can be obtained by referring to the following examples which are not intended, however, to be unduly limitative of the invention.

EXAMPLE I

A fusible polyphenylene in the amount of 370 grams was dried overnight in vacuo at 160° C. and then dissolved in about 3 liters of alcohol-free dried chloroform. The polypehnylene had an average molecular weight of 500 to 1500 and a C:H atomic ratio of about 1.5:1. The chloroform was a commercial chloroform containing ethyl alcohol that had been treated in the manner described above. The solution was stirred while heating so as to gently reflux the material for a period of 72 hours. The equipment used was provided with a water trap so as to ensure complete removal of water. 1,3,5-benzenetrisulfonyl chloride in the amount of 123 grams was then added to the solution and heating under reflux conditions was continued for 2 hours. During this period hydrogen fluoride fumes were evolved. The resulting lacquer weighed 4610 grams and contained about 11 weight percent solids.

EXAMPLE II

The lacquer prepared in Example I was employed in the fabrication of a 264-ply laminate, using carbon cloth as the reinforcing material. Firstly, lacquer was brushed on the cloth which was then air dried to remove chloroform. A stack of 264 plies of the prepolymer-coated cloth was then heated in a mold at a temperature of 500° F. and under a pressure of 6500 p.s.i. for a period of 24 hours. The laminate so produced had a resin content of 39 weight percent, a void content of 7.7 volume percent and a density of 1.40.

EXAMPLE III

A 264-ply laminate was prepared in the same manner as described in Example II except that the chloroform used in preparing the lacquer had not been treated to remove ethyl alcohol. The laminate obtained had a void content of 25 volume percent and a density of 1.00.

From the data in the foregoing examples, it is seen that a laminate fabricated with a polyphenylene lacquer prepared in accordance with the process of this invention has a very low void content. On the other hand a laminate fabricated with a polyphenylene lacquer prepared with an alcohol-containing chloroform solvent had a void content more than three times as great. Because of the lower void content of the laminate of this invention, its physical properies are greatly superior to the laminate with the higher void content.

As will be evident to those skilled in the art, various modifications of this invention can be made in view of the foregoing disclosure without departing from the spirit or scope of the invention.

I claim:

1. A process for preparing a polyphenylene lacquer which comprises dissolving in alcohol-free chloroform a fusible polyphenylene having an average molecular weight up to 4000; refluxing the resulting solution through a water removal zone for a period of from about 3 to 96 hours; adding to the solution 1 part by weight of an arylpolysulfonyl halide for about 2 to 3 parts by weight of the polyphenylene; and continuing to reflux the solution for a period in the range of about 0.5 to 2 hours.

2. The process according to claim 1 in which the fusible polyphenylene has an average molecular weight in the range of 500 to 1500.

3. The process according to claim 1 in which the polyphenylene has an average molecular weight in the range of 500 to 1500 and the arylpolysulfonyl halide is a compound selected from the group consisting of a benzenepolysulfonyl chloride, a benzenepolysulfonyl bromide, a biphenylpolysulfonyl chloride, a biphenylpolysulfonyl bromide, and disulfonyl halide derivatives having the following structural formula:

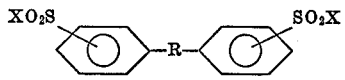

wherein R is selected from the group consisting of

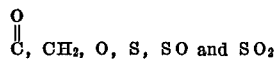

and X is Cl or Br.

4. The process according to claim 3 in which the arylpolysulfonyl halide is 1,3,5-benzenetrisulfonyl chloride.

5. The process according to claim 3 in which the arylpolysulfonyl halide is 1,3,5-benzenetrisulfonyl bromide.

6. The process according to claim 3 in which the arylpolysulfonyl halide is 4,4'-biphenyldisulfonyl chloride.

7. The process according to claim 3 in which the arylpolysulfonyl halide is 3,3'-biphenyldisulfonyl bromide.

References Cited

UNITED STATES PATENTS 3,560,428   2/1971   Bilow _____ 260—33.8 R
3,677,976   7/1972   Miller et al. ____ 260—33.8 RX LEWIS T. JACOBS, Primary Examiner U.S. Cl. X.R.

260—2 H, 79.3 R